(12) United States Patent
Hardjono

(10) Patent No.: US 6,993,138 B1
(45) Date of Patent: Jan. 31, 2006

(54) SPATIAL KEY TREES FOR KEY MANAGEMENT IN WIRELESS ENVIRONMENTS

(75) Inventor: Thomas Hardjono, Winchester, MA (US)

(73) Assignee: Nortel Networks Limited, (CA)

( * ) Notice: Subject to any disclaimer, the term of this patent is extended or adjusted under 35 U.S.C. 154(b) by 935 days.

(21) Appl. No.: 09/877,150

(22) Filed: Jun. 8, 2001

Related U.S. Application Data

(60) Provisional application No. 60/232,249, filed on Sep. 14, 2000.

(51) Int. Cl.
*H04L 9/00* (2006.01)
*H04L 9/32* (2006.01)
*H04L 9/08* (2006.01)
*H04L 9/14* (2006.01)
*H04M 1/66* (2006.01)

(52) U.S. Cl. .................. 380/281; 380/247; 380/277; 380/278; 380/284; 455/410; 455/411; 455/422.1; 455/456.1; 455/456.5; 713/157; 713/177; 713/201

(58) Field of Classification Search ............. 713/201, 713/157, 177; 380/277, 284, 278, 281, 247; 455/410, 411, 422.1, 456.1, 456.5
See application file for complete search history.

(56) References Cited

U.S. PATENT DOCUMENTS

| | | | |
|---|---|---|---|
| 5,748,736 A | | 5/1998 | Mittra ...................... 380/21 |
| 5,884,147 A | * | 3/1999 | Reudink et al. ......... 455/67.11 |
| 6,049,878 A | * | 4/2000 | Caronni et al. ........... 713/201 |

OTHER PUBLICATIONS

Katz, R., "Adaptation and Mobility in Wireless Information Systems," IEEE Personal Communications (First Quarter 1994), p. 13.*
Gong et al, "Multicast security and its extension to a mobile environment," Wireless Networks I, 1995.*
Ko et al, "Location-Based Multicast in Mobile Ad Hoc Networks," Sep. 3, 1998, available at http://citeseer.ist.psu.edu/51969.html.*
Omar et al, "Multicast Support for Mobile-IP with the Hierarchical Local Registration Approach," Proceedings of WOWMOM'00, Aug. 2000.*
Ramjee et al, "IP-Based Access Network Infrastructure for Next-Generation Wireless Data Networks," IEEE Personal Communications, Aug. 2000.*

(Continued)

*Primary Examiner*—Greg Morse
*Assistant Examiner*—John Elmore
(74) *Attorney, Agent, or Firm*—Steubing McGuinness & Manaras LLP

(57) ABSTRACT

A system, method, and program code are given for secure communication. Multiple geographic cells are arranged in a hierarchical tree having a root node and internal nodes. The root node and each internal node in the tree have an associated node cryptographic key for secure communication with lower nodes in the tree. Each cell is associated with a leaf node of the tree and a cell cryptographic key for secure communications with devices located within the cell. A key management center is at the root node for determining an anticipated cell path of a mobile device from a current cell to a destination cell. The key management center distributes to the mobile device a set of cryptographic keys from the tree. This set contains a minimum number of cryptographic keys necessary to permit secure communications for the mobile device within each cell along the anticipated cell path, but no other cells.

20 Claims, 6 Drawing Sheets

OTHER PUBLICATIONS

Campbell et al, "Design, Implementation, and Evaluation of Cellular IP," IEEE Personal Communications, Aug. 2000.*

Kruus, P., "A Survey of Multicast Security Issues and Architectures," Naval Research Laboratory Report, 1998.*

Briscoe, Bob, "MARKS: Zero Side Effect Multicast Key Management using Arbitrarily Revealed Key Sequences", in *First International Workshop on Networked Group Communications* (Nov. 1999).

Hardjono, T., et al, "A Framework for Group Key Management for Multicast Security", <draft—ieff—ipsec—gkm framework—03.txt), Aug. 2000.

McGrew, David A., et al, "Key Establishment in Large Dynamic Groups Using One-Way Functions Trees", TIS Report No. 0755, TIS Labs at Network Associates, Inc., Glenwood, Md (May 1998).

Rodeh, Ohad, et al, "Using AVL Trees for Fault Tolerant Group Key Management", manuscript, Oct. 2000.

Wallner, D., et al, "Key Management for Multicast: Issues and Architectures", RFC2627, Jul. 1997.

Wong, Chung Kei, et al, "Secure Group Communications Using Key Graphs", WGL98, in *Proceedings of SIGCOMM'98*, Sep. 1998.

* cited by examiner

SPATIAL KEY TREES FOR KEY MANAGEMENT IN WIRELESS ENVIRONMENTS

This application claims benefit of provisional Ser. No. 60/232,249 filed on Sep. 14, 2000.

FIELD OF THE INVENTION

The present invention relates generally to wireless communication systems, and more particularly to encryption key management in a wireless communication system.

BACKGROUND ART

Systems for secure communications rely on cryptographic techniques to ensure that communications within the system are available to authenticated users only. Generally, a message is encrypted with a cryptographic key so that only authenticated users can decrypt the message. Even in the simplest case of a single user, the protocol for providing the proper key to the proper user can be rather elaborate. In a network having multiple authorized users with various sending and receiving privileges, the distribution and management of cryptographic keys can be quite complicated.

Some key management protocols for group-shared keys employ the so-called Wallner tree, more generally known as a "key tree". Key trees are of major importance for key management of group-communications, such as IP multicast and application-layer group transmissions. In a key tree, a hierarchy of cryptographic keys is created based on a special selected mathematical function. The key for a given node in the tree is derived from the key of its parent node, and the keys for its children nodes are derived from itself. An example of a mathematical function used to form a key tree is the one-way hash function (OWHF), where a ChildKey=OWHF(ParentKey). Specific systems using a key tree approach are described, for example, in D. M. Wallner, E. Harder, R. C. Agee, *Key Management for Multicast: Issues and Architectures*, September 1998; and C. K. Wong, M. Gouda and S. Lam, "Secure Group Communications Using Key Graphs", in Proceedings of SIGCOMM'98, which are incorporated herein by reference.

An example of a key tree is shown in FIG. 1, where the solid points represent 9 authorized entities (a root and eight users U1, U2, . . . , U8). In this structure, each of the eight users has an associated private key (K1, K2, . . , K8) that is known only to the owning user and the root. In this specific structure, the private key typically is used for private communications between the root and the respective user (unicast).

A key tree is a logical tree, meaning that the keys of the internal nodes are shared by the root and by some of the users. For example, a user may know all the keys on the tree starting from its position at a leaf node, back up the internal nodes directly to the root. Thus, in FIG. 1 for example, user U2 knows its own private key K2, and keys X3 and X1. User U4 knows K4 (its own key), X4 and X1, while User U6 knows keys K6, X5 and X2.

One typical use of a key tree is for management of a Traffic Encryption Key (TEK) that is used for the encryption of data being multicasted to a group, and a Key Encryption Key (KEK) for encrypting the TEK when the TEK is transmitted. The root is typically assigned to hold the TEK and the KEK, and it uses the keys within the key tree to send the encrypted TEK either to all the users on the tree, or only to specific selected users. Thus, assuming the TEK is to be multicasted to the entire group, the Root would simply encrypt the TEK under the KEK and send the encrypted TEK to the multicast address of the group. Non-members may be able to snoop the packet, but they will not be able to decrypt that packet containing the encrypted TEK. To send the TEK or KEK to a subset of the entire group (for example, users U1, U2, U3 and U4 in FIG. 1), the root can use key X1 to encrypt the designated TEK or KEK, and multicast the ciphertext to the entire group in a single message. The other users (U5, U6, U7 and U8 in FIG. 1) will simply drop that packet since they will not be able to decrypt it.

At first, it might appear simpler to associate a single key with each user and manage each of these individual keys as required. But, for each user in a large group to be able to communicate with each of the other users, all users must have the keys for all of the other users. This is a significant management problem that involves the distribution of large numbers of keys and substantial storage requirements; a problem made even more difficult when accounting for factors such as adding and deleting members of the group. The logical hierarchy of the key tree and the encryption keys associated with higher level nodes means that key management can use fewer and smaller messages containing fewer keys broadcast over the network using less bandwidth than would be possible with the simpler scheme.

From the above example, it is easy to see that key trees are useful for the management of cryptographic keys within groups. Currently, efforts are underway in the IETF to standardize group key protocols.

In another application, a key tree may be used for pay-per-view type subscription services as described, for example, in B. Briscoe, *Zero Side Effect Multicast Key Management using Arbitrarily Revealed Key Sequences*, BT Labs Report 1999, which is incorporated herein by reference. Rather than each leaf node of the tree being a user or a member of a group, the leaf nodes represent points across time. In this application, each key tree is associated with a channel or programmed unit. A subscriber pays ahead of time for the amount of programming that he or she wishes to receive in that channel. The selected amount of time determines which set of keys is given to the subscriber. To prevent illegal copying of keys by subscribers, a tamper-proof set-top box is deployed to store the keys.

Thus, as shown in FIG. 2, when a subscriber S1 wants to watch a pay-per-view channel from time t1 to t3, his set-top box must be loaded with keys X3 and K3 (the box can compute keys K1 and K3 from X3). When another subscriber wants to watch the same channel from time t4 to t7, his set-top box must be loaded with keys K4, X5 and K7 only (to prevent viewing of the channel before time t4 and after time t7). In a commercial pay-per-view environment, there will typically be one tree for each channel, and for each channel the breadth of the tree will be subject to a number of factors, including the impact of lost keys, the number of viewers, and others.

Thus, key trees are known to be useful for distributing cryptographic communications keys to multiple users in a computer network, and for communication limited to pre-defined blocks of time.

SUMMARY OF THE INVENTION

A representative embodiment of the present invention includes a secure communication system and method having a plurality of geographic cells. Each cell is associated with a specific geographic area and has a cell cryptographic key for secure communications with devices located within the cell. A key management center determines an anticipated cell path of a mobile device from a current cell to a destination cell, and distributes to the mobile device a set of cryptographic keys necessary to permit secure communications for the mobile device within each cell along the anticipated cell path.

In a further embodiment, the geographic cells may be arranged in a hierarchical tree. The tree may have a root node and multiple internal nodes, wherein each node has an associated node cryptographic key for secure communication with lower nodes in the tree. Each cell is associated with a leaf node of the tree and a cell cryptographic key for secure communications with devices located within the cell.

In one embodiment, the cryptographic key of each node below the root node may derived by applying a mathematical function (e.g., a one-way has function) to the cryptographic key of the next higher level node. The mobile device may also know the cryptographic key of each node in the tree on a direct path back to the root node.

In a further embodiment, at least one hierarchical level of the tree uses a structure of at least three dimensions to connect to nodes in the next lower hierarchical level. This hierarchical level may be the level in the tree immediately above the leaf nodes. In a specific embodiment, the structure of at least three dimensions then may group the leaf nodes together in threes to form triangle-shaped groups of cells, or to form circular-shaped groups of cells.

Alternatively, the geographic cells may form a substantially straight line. If so, the substantially straight line formed by the geographic cells may be adjacent to another substantially straight line of geographic cells arranged in a hierarchical tree.

In another embodiment, the set of cryptographic keys distributed to the mobile device includes keys that are valid for a restricted period of time based on the anticipated cell path. The set of cryptographic keys may contain the minimum number of cryptographic keys necessary to permit secure communication with the mobile device within each cell along the anticipated cell path, but no other cells.

Embodiments of the present invention include a hierarchical cryptographic key distribution tree having a root node and multiple internal nodes. The root node and each internal node in the tree each have an associated node cryptographic key for secure communication with lower nodes in the tree. There are multiple terminal leaf nodes, each associated with a unique geographic cell and a cell cryptographic key for secure communications with devices located within the associated cell.

Another embodiment of the present invention includes a secure communication system having multiple geographic cells. Each cell is associated with a cell cryptographic key for secure communications with devices located within the cell. A key management center determines an anticipated cell path of a mobile device from a current cell to a destination cell and distributes to the user a set of cryptographic keys. The set contains the minimum number of cryptographic keys necessary to permit the mobile device to engage in secure communication within each cell along the anticipated cell path, but no other cells.

An embodiment also includes a hierarchical cryptographic key distribution tree having a root node and multiple internal nodes. The root node and each internal node in the tree has an associated node cryptographic key for secure communication with lower nodes in the tree. There are multiple terminal leaf nodes, each associated with a leaf cryptographic key for secure communications with an associated leaf device. At least one hierarchical level of the tree uses a structure of at least three dimensions to connect to nodes in the next lower hierarchical level.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF SPECIFIC EMBODIMENTS

Embodiments of the present invention use key trees for the management of cryptographic keys associated with geographic areas or spatial cells within mobile and wireless communications systems. Each area or cell is typically associated with one key (a leaf node in the key tree), and communications within a cell are encrypted under the key associated with that cell. The mobile unit or user is given a set of keys depending on the planned spatial movement, or based on the predicted geographic behavior pattern. In addition, the key management may integrate spatial management of the keys with time-key management.

Figure 1:
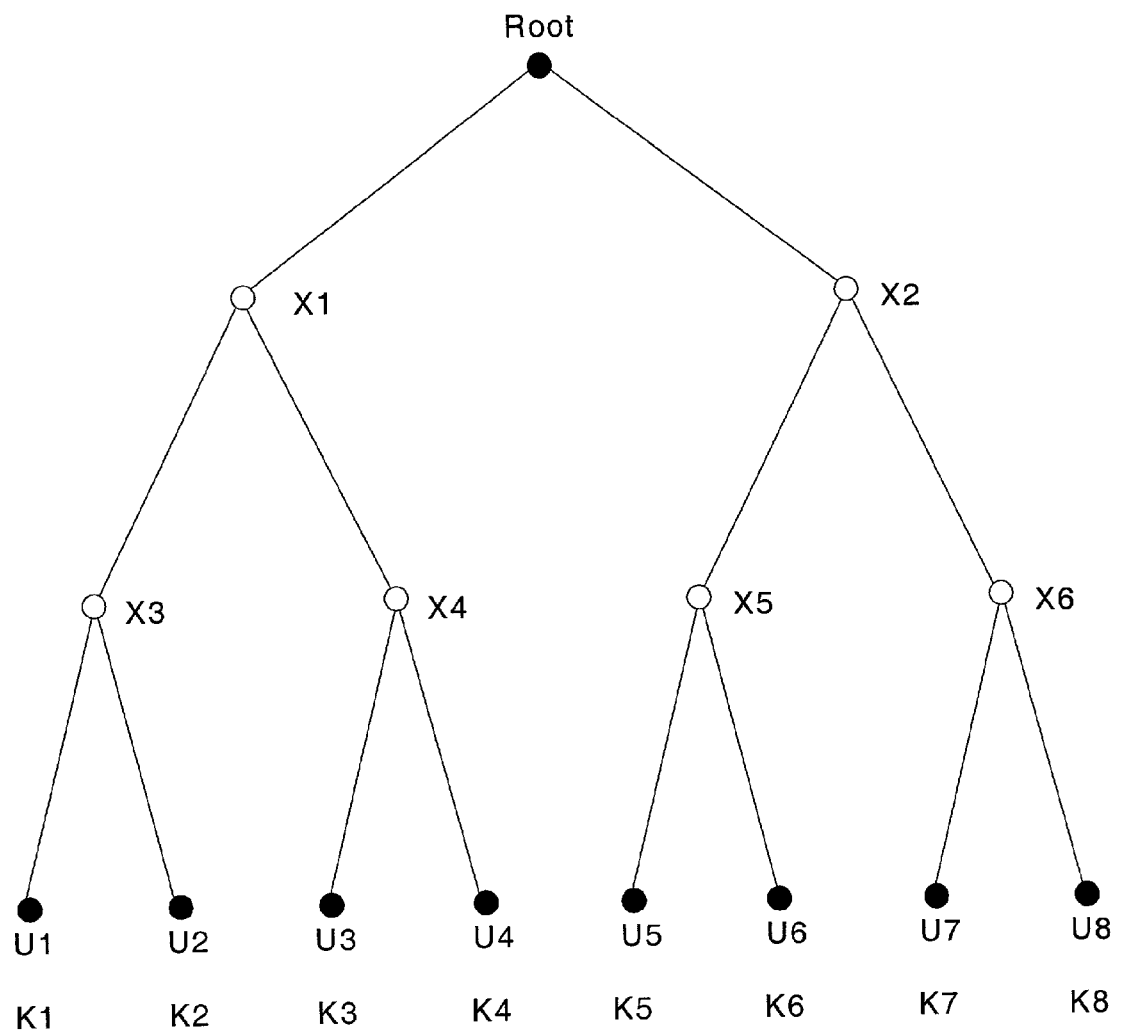
FIG. 1 shows a typical key tree.
Figure 2:
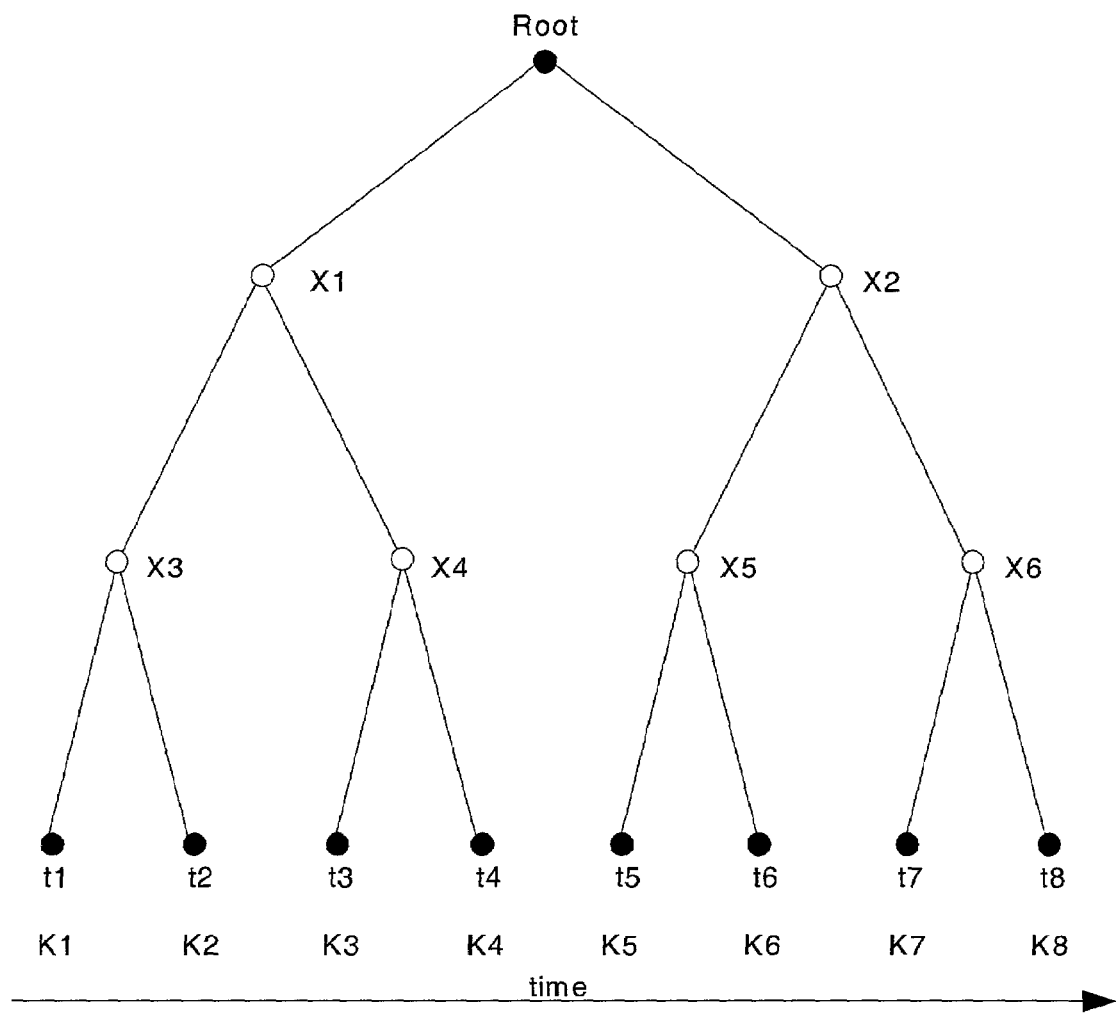
FIG. 2 shows a key tree for time units.
Figure 3:
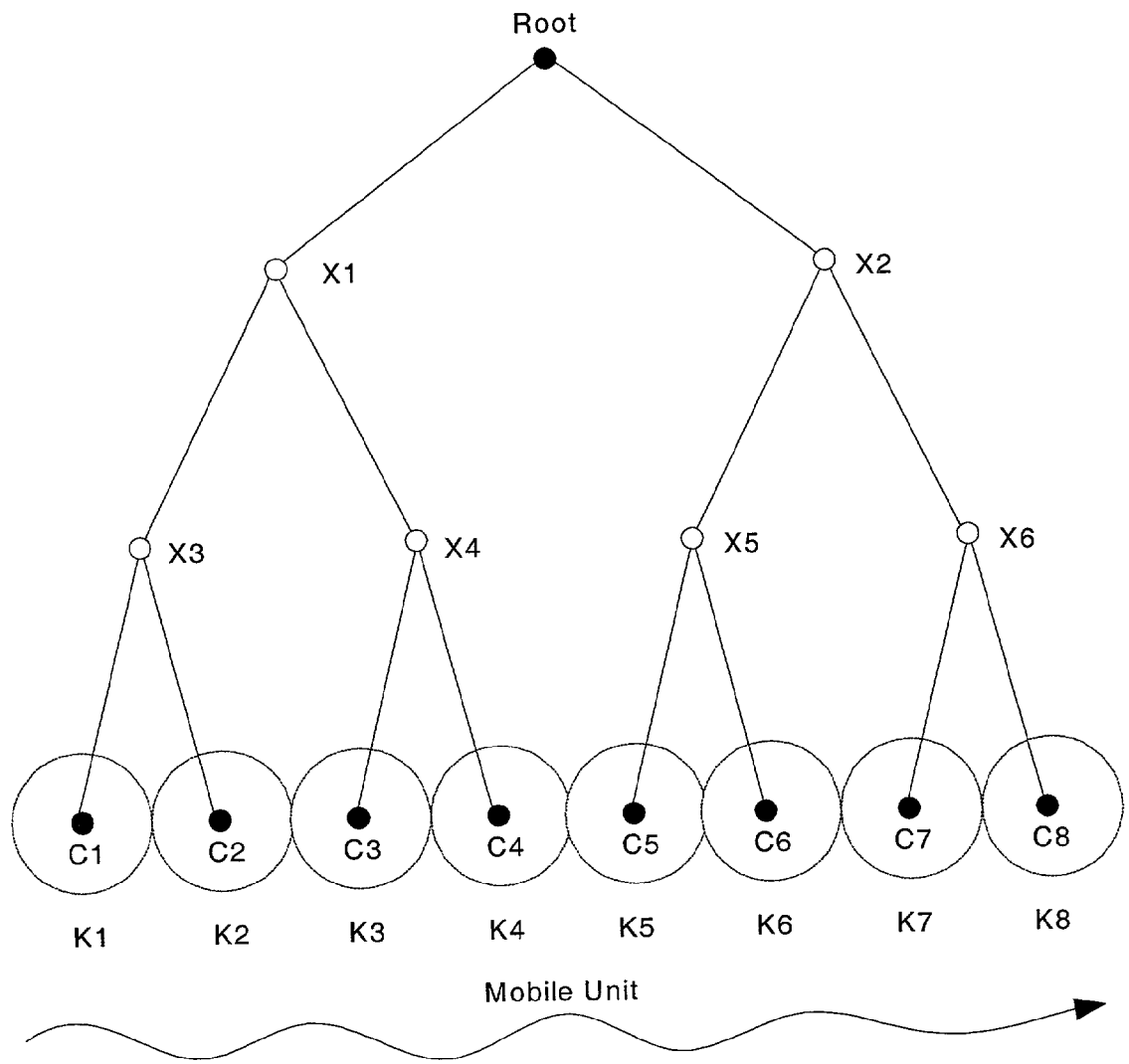
FIG. 3 shows a key tree for spatial movement of users in accordance with one embodiment of the present invention.

FIG. 3 shows a single row of areas or cells (C1, C2, . . . C8) with movement of a mobile unit across the row of cells, where data transmission in each cell is encrypted under the corresponding keys K1, K2, . . . , K8. When a mobile unit plans to move along cell C2 to C4, it is given keys K2 and X4 (from which it can derive keys K3 and K4). At each boundary and hand-over point, the mobile unit must switch to the key being used for that current cell or area. When a mobile unit establishes a pattern of movement across a wide range of cells (e.g. C1 to C4, and C5 to C8), it can be given keys X1 and X2.

Other combinations of key trees for adjacent cells can be devised, and combinations of multi-dimensional key trees can also be designed. The keys given to a mobile unit can then be computed based on the pattern of behavior of the mobile unit, such as its speed and its direction.

Figure 4:
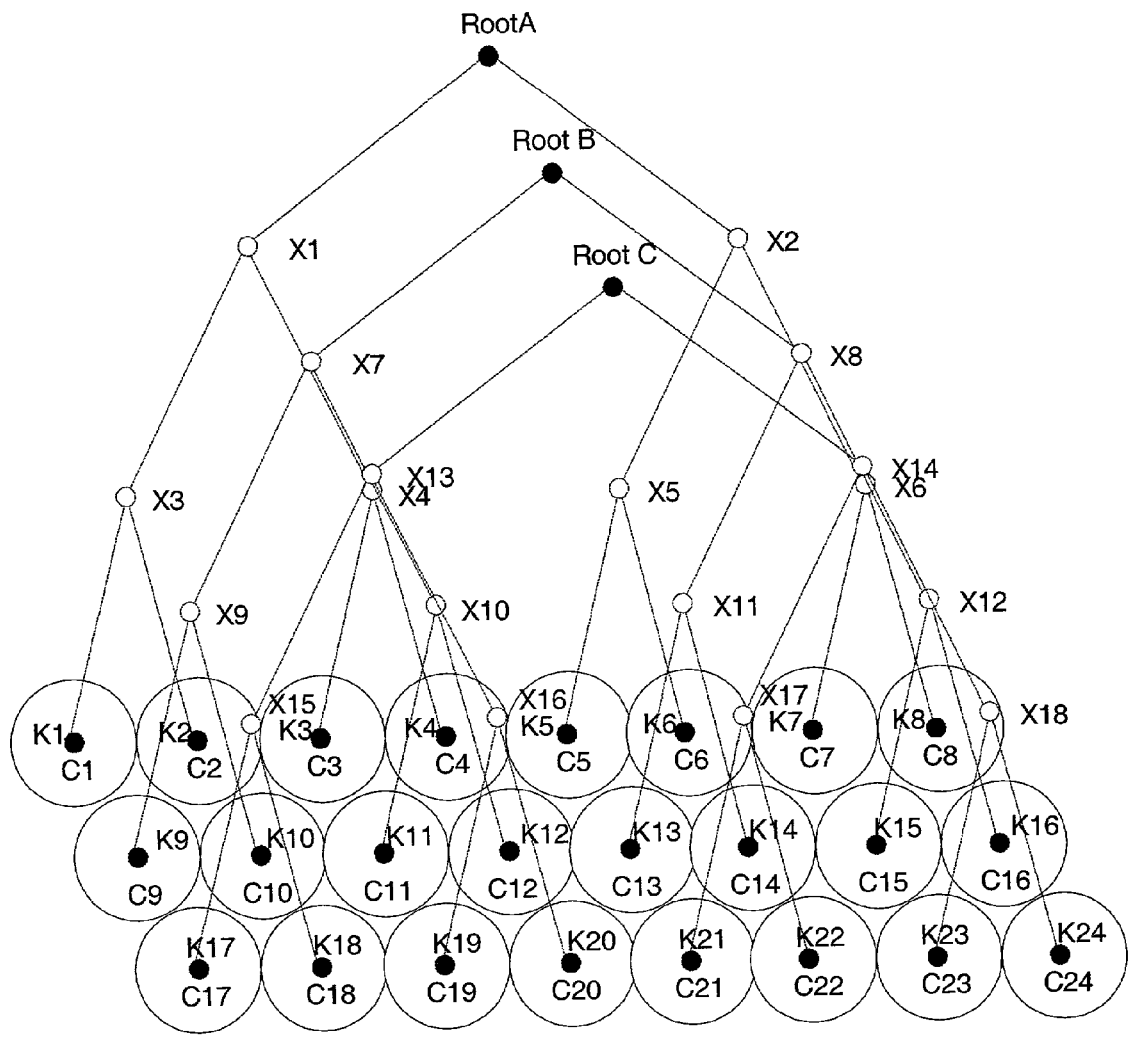
FIG. 4 shows key trees for multiple cells in a wireless environment in accordance with an embodiment of the present invention.

The structure of the tree for multiple rows of cells or areas lends itself to the internal nodes (keys) being combined using some mathematical function such as a one-way hash function. In addition, keys of adjacent cells (e.g. 7 immediately adjacent cells) may be combined under a single internal node (i.e. key) to allow the mobile unit to move from one cell to any of the 6 immediately adjacent cells. This is shown in FIG. 4.

Figures 5A, 5B:
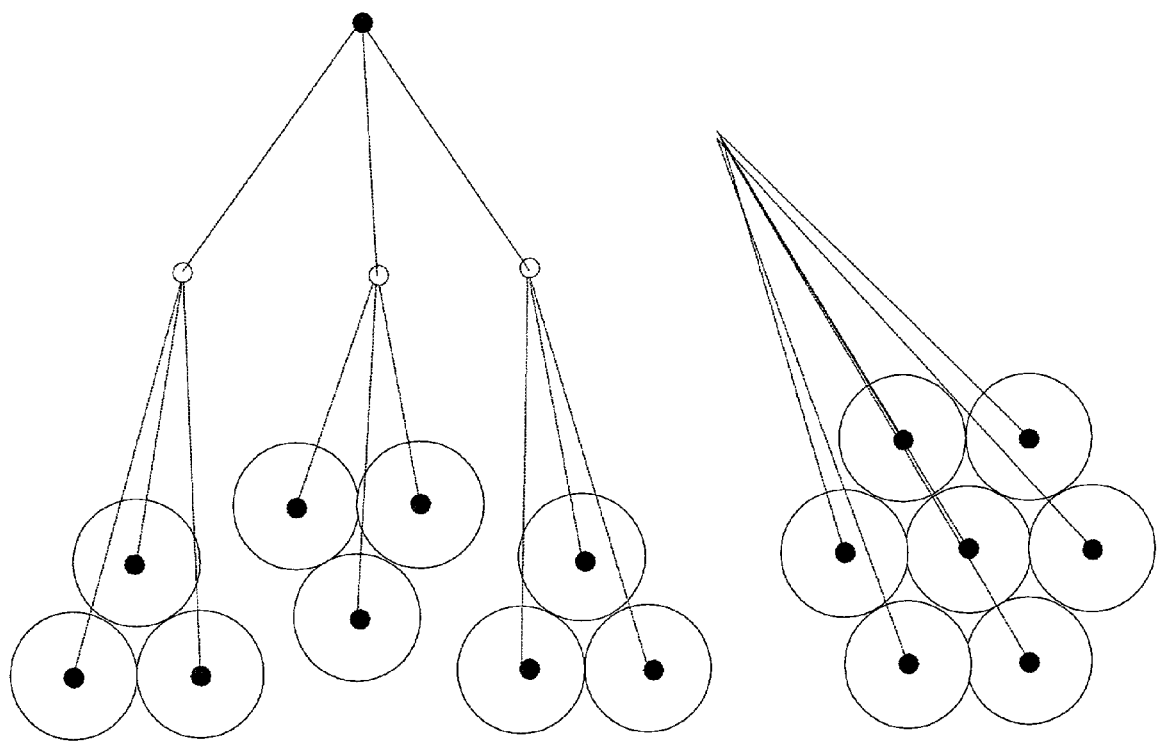
FIG. 5A shows a portion of a key tree for a triangular arrangement of three adjacent cells in accordance with an embodiment of the present invention.
FIG. 5B shows a portion of a key tree for a circular arrangement of seven adjacent cells in accordance with an embodiment of the present invention.

There are virtually endless combinations of keys that can make up a key tree. FIG. 5A shows one combination scheme based on three keys for three triangularly adjacent cells in a wireless environment. This basic shape can be the basis for building other combination of key trees. FIG. 5B shows another combination scheme based on a seven-cell circular arrangement, which is also optimal from the point of view of the mobile unit moving from the center cell to the other adjacent cells.

Figure 6:
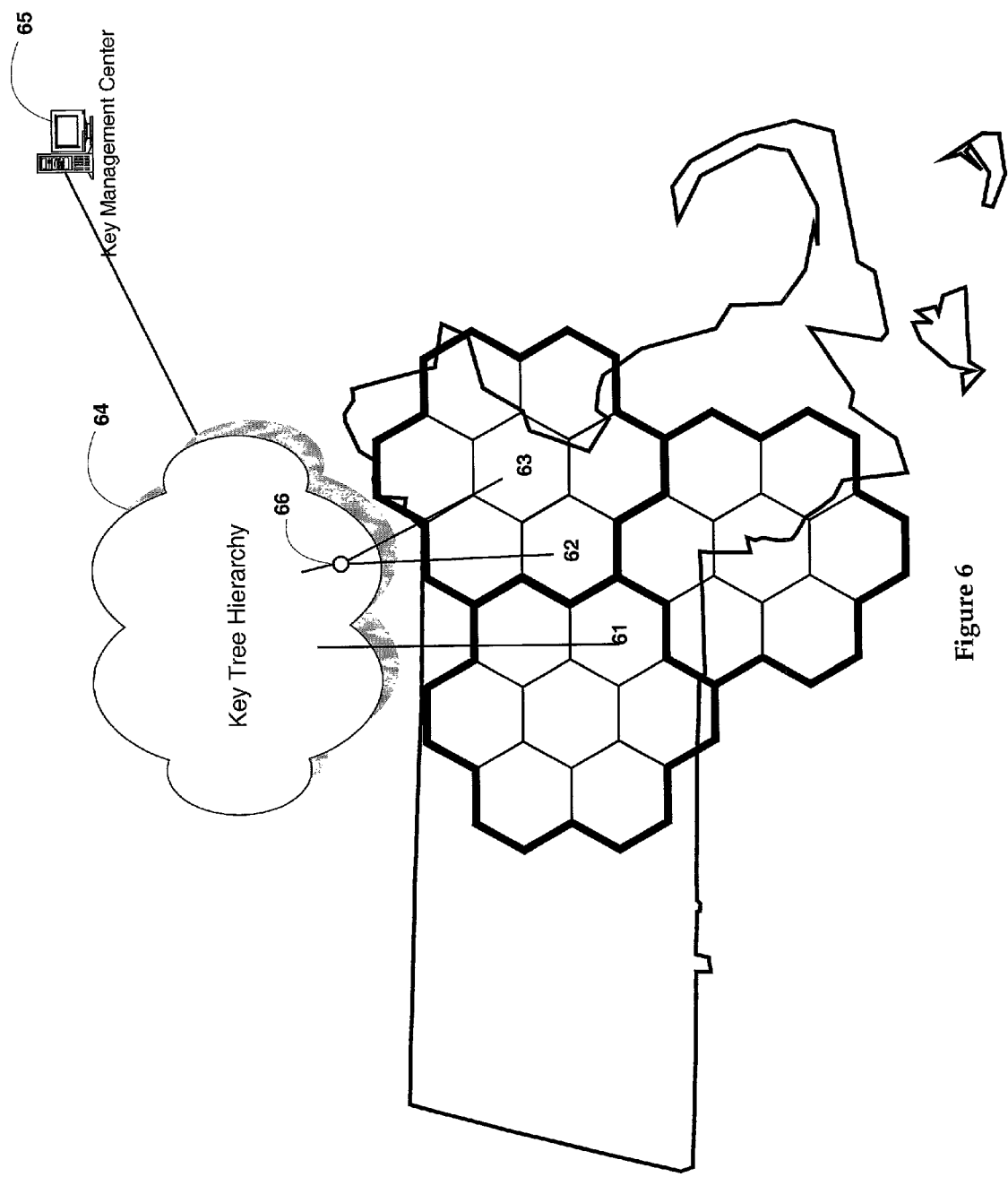
FIG. 6 shows the logical structure of a system according to one embodiment of the present invention.

FIG. 6 shows the logical structure of a system according to one embodiment. A key management center 65 is the root for and controls all the cryptographic keys of a key tree hierarchy 64. Each leaf node in the key tree hierarchy 64 represents a geographic cell such that a specific geographic area is overlaid with a pattern of adjacent cells as shown in FIG. 6. Although each of the cells is connected to the key tree hierarchy 64, for clarity of illustration only a simplified portion of these connections are shown in FIG. 6. Specifically, cell 61 is shown as connected to an unspecified portion of the key tree hierarchy 64, and cells 62 and 63 are connected to a mutual parent node 66 in the key tree hierarchy 64.

In a typical situation, the key management center 65 may be aware of a user who will be traveling from cell 61 through cell 62 to cell 63. This may be because the user has expressly communicated his travel plan. Or, the key management center 65 may track of have access to past geographic behavior of the user. For example, the key management center may have information that the user has been actively traveling through a sequence of cells corresponding to the path of a major interstate highway, and accordingly project that the user will continue to travel along the interstate in the same direction, through cells 61, 62, and 63.

Because cells 62 and 63 share a common parent node, the key management center 65 does not need to provide to the user separate cryptographic keys for each cell 61, 62, and 63. Rather, only two keys need to be provided to the user, those for cell 61 and node 66. This reduces and simplifies the key management overhead.

In a further embodiment, the geographic management of the cryptographic keys in the key tree hierarchy 64 can be integrated with time management techniques. In other words, the key management center 65 can use cryptographic keys for each cell that invalid outside the predicted time that user is expected to be in the corresponding cell. For example, by the time that the user is entering cell 63 from cell 62, the key associated with cell 61 may have expired, thereby restricting the user to communications within cells 62 and 63.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A secure communication system comprising:
   a plural of geographic cells, each cell being associated with a specific geographic area and having a cell cryptographic key for secure communications with devices located within the cell; and
   a key management center that determines an anticipated cell path of a mobile device from a current cell to a destination cell and distributes to the mobile device a set of cryptographic keys necessary to permit secure communications for the mobile device within each cell along the anticipated cell path.

2. A system according to claim 1, further comprising:
a hierarchical tree having a root node, a plurality of internal nodes, and a plurality of terminal leaf nodes, the root node and each internal node having an associated node cryptographic key for secure communication with lower nodes in the tree, each leaf node being associated with a specific geographic cell.

3. A system according to claim 2, wherein the cryptographic key of each node below the root node is derived by applying a mathematical function to the cryptographic key of the next higher level node.

4. A system according to claim 2 wherein the mobile device knows the cryptographic key of each node in the tree on a direct path back to the root node.

5. A system according to claim 2, wherein at least one hierarchical level of the tree uses a structure of at least three dimensions to connect to nodes in the next lower hierarchical level.

6. A system according to claim 1, wherein the set of cryptographic keys distributed to the mobile device includes keys that are valid for a restricted period of time based on the anticipated cell path.

7. A system according to claim 1, wherein the set of cryptographic keys contains the minimum number of keys necessary to permit secure communications for the mobile device within each cell along the anticipated cell path, but no other cells.

8. A method of secure communication comprising:
providing a plurality of geographic cells, each cell being associated with a specific geographic area and having a cell cryptographic key for secure communications with devices located within the cell;
determining an anticipated cell path of a mobile device from a current cell to a destination cell; and distributing to the mobile device a set of cryptographic keys necessary to permit secure communications for the mobile device within each cell along the anticipated cell path.

9. A method according to claim 8, farther comprising:
arranging a hierarchical tree having a root node, a plurality of internal nodes, and a plurality of terminal leaf nodes, the root node and each internal node having an associated node cryptographic key for secure communication with lower nodes in the tree, each leaf node being associated with a specific geographic cell.

10. A method according to claim 9, wherein the cryptographic key of each node below the root node is derived by applying a mathematical function to the cryptographic key of the next higher level node.

11. A method according to claim 9, wherein the mobile device knows the cryptographic key of each node in the tree on a direct path back to the root node.

12. A method according to claim 9, wherein at least one hierarchical level of the tree uses a structure of at least three dimensions to connect to nodes in the next lower hierarchical level.

13. A method according to claim 8, wherein the set of cryptographic keys distributed to the mobile device includes keys that are valid for a restricted period of time based on the anticipated cell path.

14. A method according to claim 8, wherein the set of cryptographic keys contains the minimum number of keys necessary to permit secure communications for the mobile device within each cell along the anticipated cell path, but no other cells.

15. A computer program product for use on a computer system for secure communication in a computer network, the computer program product comprising a computer usable medium having computer readable program code thereon, the computer readable program code comprising:
program code for providing a plurality of geographic cells, each cells being associated with a specific geographic area and having a cell cryptographic key for secure communications with devices located within the cell;
program code for determining an anticipated cell path of a mobile device from a current cell to a destination cell; and
program code for distributing to the mobile device a set of cryptographic keys necessary to permit secure communications with the mobile device within each cell along the anticipated cell path.

16. A computer program product according to claim 15, further comprising:
program code for arranging a hierarchical tree having a root node, a plurality of internal nodes, and a plurality of terminal leaf nodes, the root node and each internal node in the tree having an associated node cryptographic key for secure communication with lower nodes in the tree, each leaf node being associated with a specific geographic cell.

17. A computer program product according to claim 16, wherein at least one hierarchical level of the tree uses a structure of at least three dimensions to connect to nodes in the next lower hierarchical level.

18. A computer program product according to claim 17, wherein the at least one hierarchical level is the level in the tree immediately above the leaf nodes.

19. A computer program product according to claim 15, wherein the set of cryptographic keys distributed to the mobile device includes keys that are valid for a restricted period of time based on the anticipated cell path.

20. A computer program product according to claim 15, wherein the set of cryptographic keys contains the minimum number of keys necessary to permit secure communications for the mobile device within each cell along the anticipated cell path, but no other cells.

* * * * *